United States Patent [19]
Hodges

US005771830A

[11] Patent Number: 5,771,830
[45] Date of Patent: Jun. 30, 1998

[54] METHOD AND APPARATUS FOR MANIPULATING A LENGTH OF FLEXIBLE MATERIAL

[75] Inventor: Michael John Hodges, Buckinghamshire, England

[73] Assignee: Detexomat Machinery Limited, Buckinghamshire, England

[21] Appl. No.: 631,709

[22] Filed: Apr. 10, 1996

[51] Int. Cl.[6] .................................................... D05B 33/00
[52] U.S. Cl. .............................. 112/470.15; 112/475.12
[58] Field of Search ...................... 198/443; 112/470.15, 112/475.12, 470.08

[56] References Cited

U.S. PATENT DOCUMENTS

| | | |
|---|---|---|
| Re. 30,410 | 10/1980 | Povlacs . |
| 2,722,348 | 2/1955 | Ammon . |
| 2,898,021 | 6/1959 | Miles et al. . |
| 3,353,726 | 11/1967 | Kronsbein . |
| 3,355,074 | 11/1967 | Brewin et al. . |
| 3,672,313 | 6/1972 | Firestein et al. . |
| 3,696,942 | 10/1972 | Kitchener, et al. . |
| 3,704,565 | 12/1972 | Glaze, Jr. . |
| 3,793,968 | 2/1974 | Beazley . |
| 3,941,069 | 3/1976 | Fukuyama . |
| 4,099,789 | 7/1978 | Zaglio . |
| 4,166,556 | 9/1979 | Annas, Sr. . |
| 4,364,320 | 12/1982 | Nakhle et al. . |
| 4,440,329 | 4/1984 | Hodges . |
| 4,538,534 | 9/1985 | Frazier et al. . |
| 4,539,924 | 9/1985 | Bell, Jr. et al. . |
| 4,550,868 | 11/1985 | Hodges et al. . |
| 4,598,817 | 7/1986 | Bell, Jr. et al. . |
| 4,602,710 | 7/1986 | Bell, Jr. et al. . |
| 4,620,494 | 11/1986 | Takatori et al. . |
| 4,643,340 | 2/1987 | Bailey . |
| 4,649,838 | 3/1987 | Gazzarrini . |
| 4,784,070 | 11/1988 | Thurner et al. . |
| 4,862,815 | 9/1989 | Thurner et al. . |
| 4,943,198 | 7/1990 | McCabe .............................. 198/443 X |
| 5,040,475 | 8/1991 | Fournier et al. . |
| 5,165,355 | 11/1992 | Fournier et al. . |
| 5,511,501 | 4/1996 | Bell et al. .......................... 112/470.15 |
| 5,544,603 | 8/1996 | Bell et al. .......................... 112/475.12 |

FOREIGN PATENT DOCUMENTS

| | | |
|---|---|---|
| 0508014A2 | 10/1992 | European Pat. Off. . |
| 0521206A1 | 1/1993 | European Pat. Off. . |
| 2003556 | 11/1969 | France . |
| 2148248 | 3/1973 | France . |
| 2377344 | 8/1978 | France . |
| 2660638 | 10/1991 | France . |
| 2013738 | 8/1979 | United Kingdom . |
| 2081316 | 2/1982 | United Kingdom . |
| WO 9527097 | 10/1995 | WIPO . |

OTHER PUBLICATIONS

European Search Report (3 pages); Aug. 7, 1996.

*Primary Examiner*—Paul C. Lewis
*Attorney, Agent, or Firm*—Dority & Manning, P.A.

[57] ABSTRACT

An apparatus is provided for orienting flaccid material such as hose blanks having toe ends and bulkier welt ends while they are being conveyed from a supply point to a receiving point to ensure that blanks arriving at the receiving point are received, for example, toe end first. The apparatus includes first and second suction conduits in communication with an outlet. The first conduit has an inlet to which hose blanks are successively presented. An orientation determining mechanism senses which end of a blank enters the inlet. If a toe end is sensed, the hose is permitted to travel unhindered to the outlet. If, however, a welt end is sensed at the inlet, suction is created in the second conduit, and the welt end is temporarily drawn into the second conduit. While the welt end is thus located, suction in the first conduit causes the toe end to be drawn therealong, past the second conduit and toward the outlet. In this way, the hose blank is turned end-for-end, and, on relieving the suction in the second conduit, the blank is freed to travel toe first through the outlet to the receiving point.

24 Claims, 9 Drawing Sheets

METHOD AND APPARATUS FOR MANIPULATING A LENGTH OF FLEXIBLE MATERIAL

The present invention relates to methods and apparatus for manipulating a length of flexible material (i.e. limp articles) having dissimilar ends and is particularly, but not exclusively, applicable to manipulating hose blanks.

If a length of flexible material is to be processed by an automatic machine it is necessary to first load the material appropriately prior to processing. In the case of pantyhose manufacture, for example, the processing of hose blanks to make pantyhose generally involves three basic machines namely a line closer, a toe closer and a gusset sewing machine. Linking machines are available which can automatically transfer partially processed pantyhose between one machine and the other but in order to obtain a fully automated system it is necessary that the first machine in the sequence is also loaded automatically rather than manually by an operator.

In order to effect such automatic loading it is necessary to both retrieve a single length of the flexible material, in this particular example a hose blank, from a collection of them and, if the lengths of material are asymmetric, also to orient the length of material so it can be properly loaded onto the first machine of the series.

Most hosiery leg blanks are produced on small diameter knitting machines and after knitting each is sucked pneumatically into a dispensing device which is usually a feature of the knitting machine. The hose blanks are then ejected or dispensed from the dispensing device into a sack where they can be subject to some form of relaxation. Relaxation is a process where the hose blanks are tumbled or vibrated while being subjected to steam or hot air which has the effect of relaxing or "shrinking" them. At the end of the knitting process, therefore, the manufacturer has a number of hosiery leg blanks in bags which are then delivered to the making up room to be processed by the pantyhose processing machines. The hose blanks are asymmetric in that they have a toe end and a bulkier welt end and have to be loaded on the first machine in one orientation, usually welt end first.

The present invention seeks to provide methods and apparatus for retrieving and orienting lengths of flexible material.

According to one aspect of the present invention a retrieval apparatus for retrieving a single length of flexible material, for example a hose blank, from a collection of such lengths comprises a suction tube having an orifice and means for directing an air blast in the region of the orifice.

The retrieval apparatus can be lowered into a bin, tub or the like containing a randomly oriented collection of lengths of material and suction applied to the suction tube. One or more lengths of material may be held at the orifice but by suitable choice of orifice dimensions, readily determined by trial and error for a given application, only the one held most securely by the suction tube will be able to resist the air blast in the region of the orifice which dislodges the remaining lengths. This retrieval apparatus therefore allows a single length of flexible material to be automatically retrieved from the bin.

The retrieval apparatus preferably further includes a gripping means for gripping the length of material held at the orifice of the suction tube so the suction can be removed and the material still be held by the retrieval apparatus for future further manipulation.

An alternative apparatus for retrieval of a single length of flexible material from a collection of such lengths which has proved more reliable, according to a second aspect of the present invention, comprises:

removing means for removing one or more of said lengths of material from a storage bin and arranged to release them at the entrance of a conduit;

propelling means for selectively sucking and blowing the lengths of material along the conduit to or from an elongate dispenser, the dispenser having a latch means at the end nearer the propelling means and being configured so that only one of the lengths of material can be latched by the latch means and sufficiently long to hold the length of material when positioned lengthwise within it.

When suction is applied to the conduit the one or more lengths of material released at the entrance of the conduit are sucked to the elongate dispenser where they bunch up at the dispenser end. The latch means is then latched and by virtue of its design will engage one only, in general, of the lengths of material in the dispenser. This can be achieved by placing the latch at the apex of a narrow trapping end of the dispenser, for example, where only one of the lengths of material can reach at a time. Usually the end of the length of material will be in a position to be latched but it can happen that a folded length may be gripped at a position not adjacent an end.

The fluid flow is then reversed to act to blow the lengths of material out of the dispenser along the conduit back towards the storage bin, for example, containing the collection of lengths of material from which they came.

Only the latched length of material will remain in the dispenser, the remainder, if there was more than one in the dispenser, being returned to the collection of lengths of material. This one latched, length of the material will generally be straightened to extend along the dispenser during this process.

The blowing is stopped after a predetermined period of time, sufficient to allow any extra lengths of material to return to the collection of lengths of material, whereupon the latch is released and the dispenser opened to allow the single length of hose to drop free of the dispenser.

This apparatus therefore allows a single length of material to be retrieved from the collection of lengths of material even if the removing means element of the apparatus is not sufficiently selective to ensure only one length of material is picked up by it.

It should be noted that the retrieval apparatus of the invention in configured so that as far as possible only one length of material is latchable, but it may be that on a rare occasion more than one may be latched, if for example two lengths are stuck together for some reason, and that the absolute impossibility of latching two such lengths of material is not intended as a requirement of the retrieval apparatus of the present invention.

Generally, an end of the flexible material will be latched and so be extended along the dispenser. If not achieved, it is preferable to reload the dispenser without letting the length of material already in the dispenser drop out. This can be achieved by providing means for determining the presence of the length of material a predetermined distance from the latch, e.g. by a photodetector arrangement.

If no material is detected, the latch can be released but instead of opening the dispenser the propelling means is caused to blow again, blowing the length of material back to the collection of lengths of material.

Should no length of material have been presented to the conduit means, this determination will again show no material present at the determining means. The blowing back is now unnecessary but it can be arranged that the apparatus do so any way so the same control procedure can be used to properly locate a length of material in the dispenser just as if a folded length, say, had been latched. The single length of material dropped from the dispenser will be in a known position so can conveniently be made available to a further apparatus, as desired, for further processing of the material.

Preferably, the apparatus includes a conveyor means positioned beneath the dispenser arranged to move the dropped length of material laterally from beneath the dispenser.

Whilst not restricted to this particular use, the conveyor means can be arranged to convey the length of flexible material to a gripping means for picking up the material to present it to an orienting apparatus according to a further, independent, aspect of the present invention.

According to this further aspect of the present invention an apparatus for orienting a length of flexible material, for example a hose blank, having a first and a dissimilar second end comprises a first suction conduit and a second suction conduit both in fluid communication with an outlet, the first conduit having a inlet for receiving a length of material, an orientation determining means for determining which end of the length of material, the leading end, first enters the first conduit, and means for selectively drawing at least the leading end portion of the length of material into the second conduit if the second end is leading in which case the apparatus is arranged to present the first end as the in the first conduit for continued motion along the first conduit, the second end exiting the second conduit in the opposite direction to which it entered the second conduit.

Preferably the orientation determining means comprises a first trap which allows the first end of the length of material to pass through but not a bulkier second end and a first detecting means on the side of the trap farther away from the inlet. If the first detecting means, conveniently a photo detector comprising a light source and a photo cell, detects the length of material then it indicates to a controller that the first end is the end which first entered the first suction conduit. If the first detecting means does not detect the presence of the material within a predetermined period, e.g. 0.4s, then it indicates that the bulkier second end first entered the first suction conduit and so could not pass through the trap.

In order to determine when the controller should monitor the first detecting means to determine whether a length of material is present, the apparatus may include a further detecting means, again conveniently a photo detector, at the side of the trap nearer the entrance to the first suction conduit. The further detecting means indicates to the controller when the length of material has entered the first conduit and about to pass the first photodetector if in the correct orientation to do so. If the material is in the orientation in which it is to leave the orientation means then suction can be applied to the outlet and the material extracted from the first conduit. If, however, the length of material is in the opposite orientation to that desired then the material is drawn into the second conduit by the end which first entered the inlet which therefore presents the end which entered the first conduit second towards the outlet. This reverses the original orientation of the material to the one that is desired prior to the removal of the material via the outlet.

The material can be removed via the outlet by a further suction conduit which preferably includes a further trap. Preferably, when the application is used for orienting a hose blank, the apparatus orientates the hose blank so that the toe portion exits the outlet first and so all the hose blank up to the welt can pass through the further trap in the further conduit. The hose trap of the further suction conduit can then be exposed thereby exposing the welt end of the hose blank for further manipulation and loading on a pantyhose processing machine, e.g. by moving a portion of the second conduit or by way of a movement of the further conduit. In particular this embodiment of the invention preferably includes a hose gripper which engages with an upper portion of the welt and side grippers for engaging opposite sides of the welt which can then be retracted to open the welt end of the hose. The gripping means can be arranged to then move towards a loading arm pulling the hose blank out of the second hose trap and subsequently releasing their grip on the open welt end of the hose allowing the hose blank to engage with the loader. The loader can be configured and operative to load hose blanks on a line closing machine or a toe closing machine.

In one arrangement the further conduits can be arranged to split apart in the vicinity of the hose trap so allowing the welt to hang freely from a further hose gripper to allow more ready access to the welt end by the side hose grips.

The present invention provides apparatus which can variously retrieve and orientate a length of material but it should be appreciated that the orientation means of the present invention could be used with an alternative means of selecting a single length of material from a collection of such lengths and, similarly, the above described retrieval apparatus could be used to load an alternative orientation device.

When the retrieval apparatus and orientation apparatus of the above embodiments are used in combination it is preferable that the apparatus includes means for determining whether the portion of the hose blank held at the orifice of the retrieval apparatus hangs below the orifice by a predetermined distance. The distance is selected so that the hose blank is picked up asymmetrically with one end of the hose blank hanging clear of the other end. This ensures that only one end of the hose blank is presented to the orientation apparatus by the retrieval apparatus. The means for determining the length of the longest section of hose hanging from the apparatus conveniently comprises a photo detector at a selected distance from a datum position to which the orifice of the suction tube of the retrieval apparatus is moved prior to operation of the photo detector by the controller.

Embodiments of the present invention will now be described by way of example only with reference to the accompanying, non-scale, figures of which.

Referring to FIGS. 1 to 5 an orienting apparatus 2 for orienting, in this case hose blanks having a toe end T and bulkier welt end W, is shown.

Figure 1:
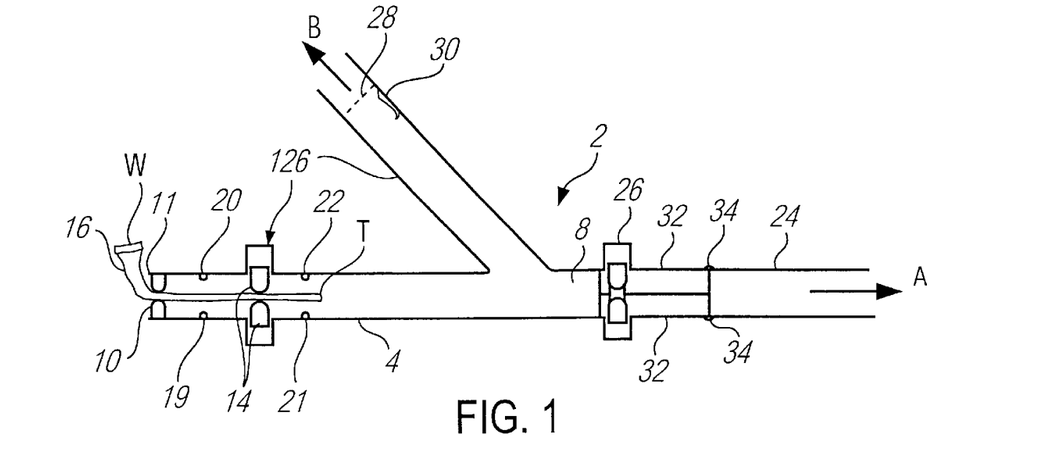
FIGS. 1 to 5 are diagrammatic plan cross-sectional views of a first embodiment of an orienting apparatus according to the present invention.
Figure 2:
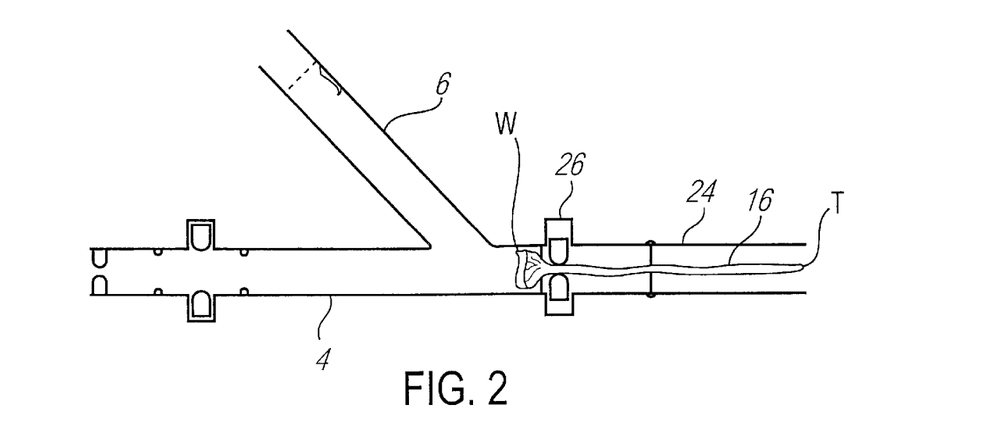
Figure 3:
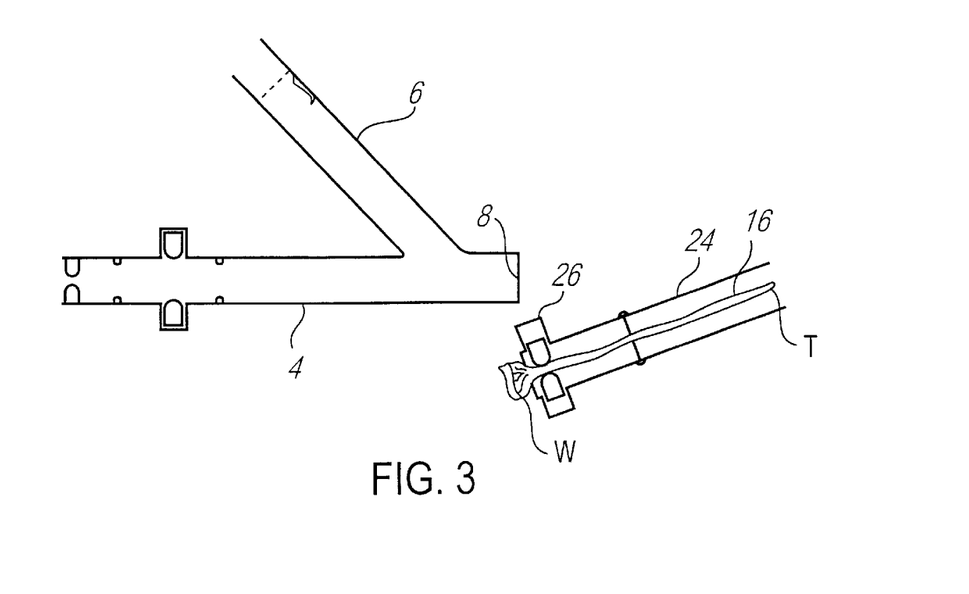
Figure 4:
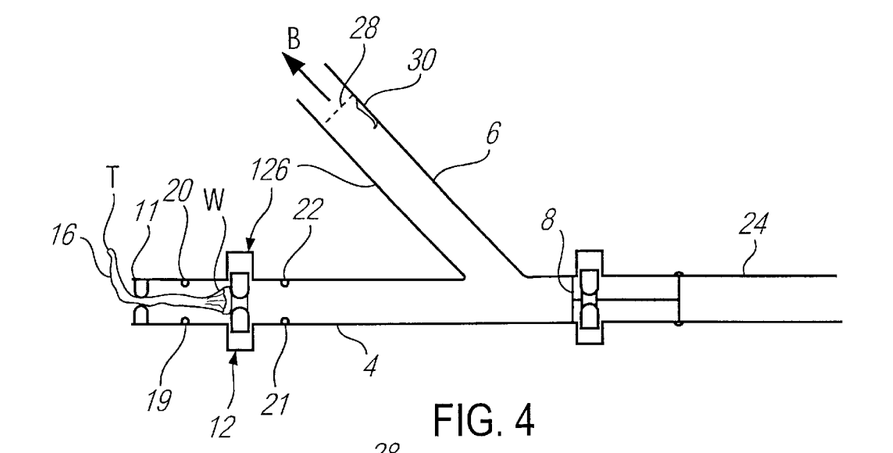
Figure 5:
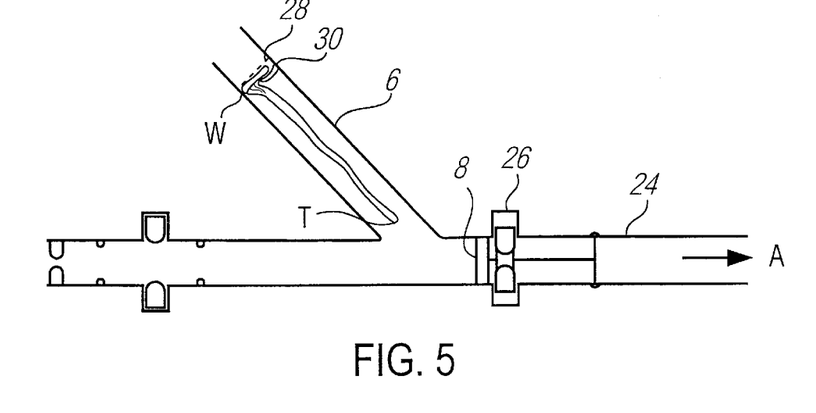

The apparatus has a first, tubular, suction conduit 4 and a second, tubular, suction conduit 6 both in fluid communication with a hose outlet 8. The first suction conduit 4 has a hose inlet 10 defined by a diaphragm 11 which guides a hose blank 16 into the central region of the conduit 4. Inside the first suction conduit 4 is a first hose trap 12 having two gate portions 14 which can be moved part laterally from a closed position as shown in FIG. 1 in which only the toe portion T of a hose blank 16 can pass through its central orifice to an open position as shown in FIGS. 2, 3 and 5 in which the entire hose blank including the bulkier welt portion W can pass.

A photo detector comprising a light bulb 19 and a photo cell 20 located between the hose inlet 10 and the first hose trap 12 detects when a hose blank 16 has entered the first suction conduit. A photo detector comprising a light bulb 21 and a photo cell 22 detects if the hose blank 16 has passed through the hose trap 12 in the first conduit 4.

The photo cells 20, 22 are electrically connected to a suitably programmed general purpose computer (not shown) which is the controller of the apparatus.

A further suction conduit 24 has a hose trap 26 defining a fixed orifice through which only a toe end T and body of the hose blank 16 can pass. A suction motor (not shown) is coupled to each end of the conduits 24 and 6 which is farther away from the hose outlet B via a valve arrangement controllable by the controller which permits the hose blank 16 to be left stationary or sucked in the directions A and B, respectively, as required.

The second conduit 6 includes a grill 28 positioned at a distance of about the length of the hose blank 16 from its intersection with the first suction conduit 4. A shorter length of conduit can be used as the hose will crumple to fit inside a shorter length tube of suitable length to present the toe end T of the hose to the first conduit and outlet. Adjacent the grill 28 and hinged to the wall of the suction conduit 6 is a latch 30 for selectively engaging, under the control of the controller, a hose blank 16 drawn against the grill 28 by the suction motor.

The end of the second conduit 24 nearer the hose trap 26 is in the form of two semi-cylindrical portions 32 mounted on hinges 34 which can be hinged open to expose a hose blank 16 lying in the second conduit 24 for easier removal by hose grippers as will be described in more detail with reference to FIGS. 8 to 10.

The apparatus of FIGS. 1 to 5 orientates the hose blank 16 in the following manner.

The hose blank 16 is drawn into the hose inlet 10 of the first conduit 4 by applying suction to conduit 24 in the direction A thereby drawing the hose blank 16 towards the hose trap 12, which is in the closed position, and past the photo cell 20. If the toe end T of the hose blank 16 has entered the hose inlet 10 first then it will pass through the hose trap 12 and be detected by the photo cell 22 as shown in FIG. 1. The controller monitors the photo cell 22 a short time after the photo cell 20 detects that the hose blank 16 has entered the conduit 4. In this case the hose blank 16 has the required orientation and so the suction continues to be applied in direction A while the controller opens the hose trap 12. This allows the hose blank 16 to be sucked to the hose trap 26. The toe end T of the hose blank 16 passes through the hose trap 26 but the welt end W of the hose blank 16 is trapped as shown in FIG. 2.

If the hose blank 16 entered the first conduit 4 welt end W first then none of the hose blank 16 will pass through the trap 12 and so photo cell 22 will not detect the hose blank a short time after the hose blank 16 is detected by the photo cell 20. This indicates to the controller that the hose blank 16 is in the reverse orientation to that required. In this case, the controller applies suction to the second conduit 6 in direction B and the hose trap 12 then released thereby allowing the hose blank to be sucked towards the grill 28. The latch 30 catches the welt end W of the hose blank 16 as shown in FIG. 5.

The suction in direction B along second conduit 6 is then stopped and suction applied to the further conduit 24 in the direction A whereupon the latch 30 is released by the controller allowing the hose blank 16 to pass through the hose trap 26 until again trapped by the bulkier welt end W as shown in FIG. 2.

The latch 30 could well be omitted and hence is but optional as the hose will pile up against the grill 28 until the suction is reversed whereupon the previously non-leading end will now become the leading end travelling towards the outlet 8. That is, control of the hose in the course of its end-for-end turning can be accomplished merely by appropriately controlling the application, timing and removal of suction in the conduits 6, 24 in this embodiment.

The apparatus therefore, orients the hose blank such that it exits the hose outlet 8 toe end first no matter what the orientation of the hose blank 16 on entering the first conduit 4 so that it can be trapped in the second hose trap 26 as shown in FIG. 2.

In this embodiment the second conduit 24 can be rotated to one side in the horizontal plane to expose the welt end W of the hose blank 16 for further manipulation as shown in FIG. 3.

Figures 8, 9, 10:
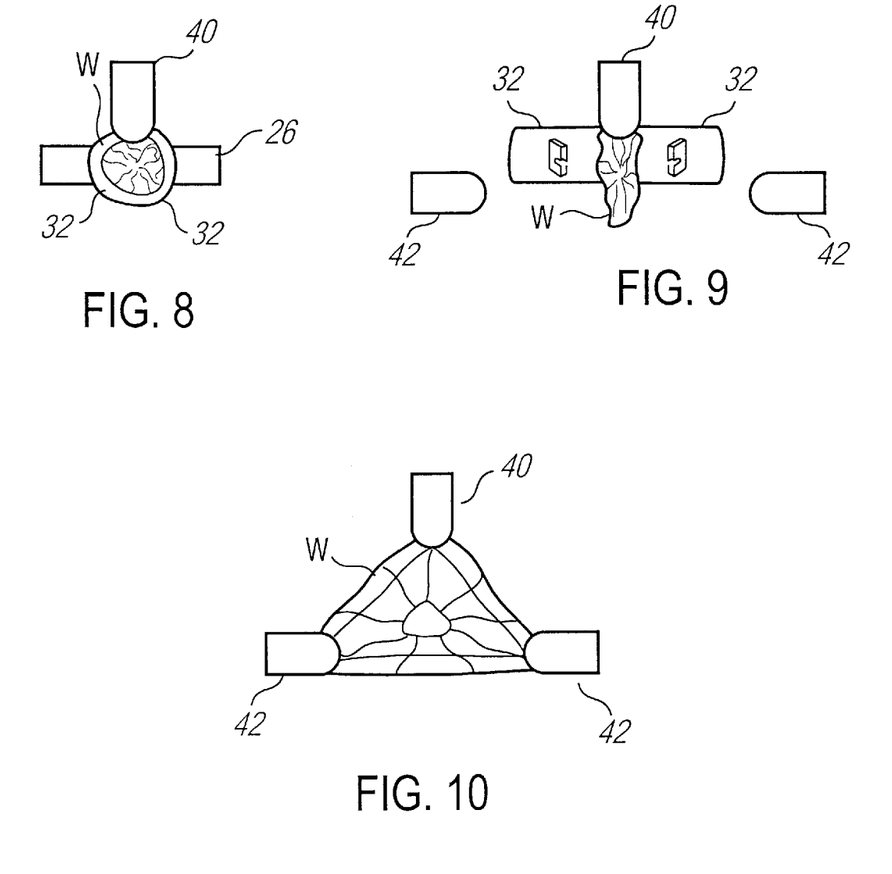
FIGS. 8 to 10 are diagrammatic end views of the upper portion of the embodiment as shown in FIG. 7 showing the operation of hose grippers gripping the welt end of a hose blank oriented by an orienting apparatus as shown in FIGS. 6 and 7.
Figure 11:
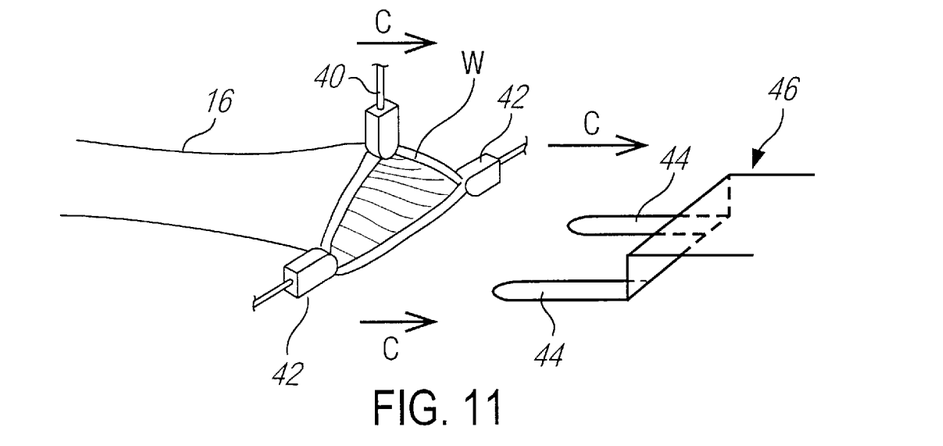
FIG. 11 is a diagrammatic perspective view showing the loading of the hose blank held shown in FIG. 10 onto a hose blank loader.

Once the second conduit 24 has been rotated to expose the welt end W of the hose blank 16, a hose gripper 40 is lowered and operated to grip the top portion of the welt W as shown in FIG. 8. The end sections 32 of the conduit 24 then are hinged open to leave the welt end W hanging freely from the gripper 40 as shown in FIG. 9 whereupon side grippers 42 are then operated to move towards and to grip respective side portions of the welt W. The grippers 40 and 42 are then moved apart to open the welt end W as shown in FIG. 10. The hose grippers 40 and 42 are then moved together horizontally to position the stretched open welt end W over the loading fingers 44 of a loading device 46 by moving horizontally in the direction of arrow C of FIG. 11. When the open welt end W of the hose blank 16 is positioned over the fingers 44 the grippers 40, 42 are opened to release the hose blank 16 whereupon the open welt end W contracts onto the fingers 44 thereby effecting loading of the hose blank on the loading fingers.

Thereafter, the loading fingers can transfer the hose blank onto the hose carrier of a line closer or toe closer in readiness for the latter to position the hose blank appropriately before the respective closing operation is performed.

Figure 6:
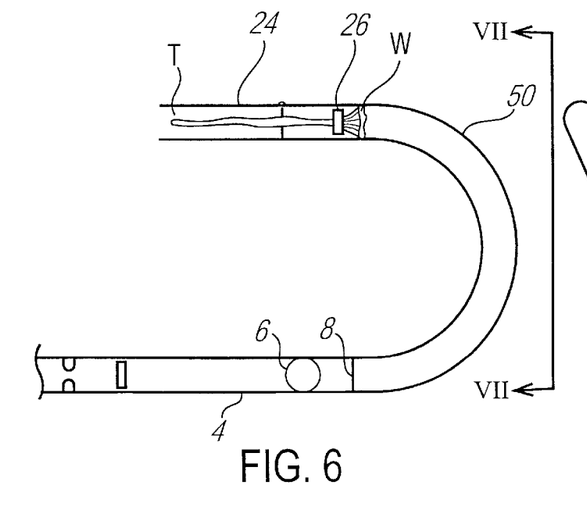
FIG. 6 is a diagrammatic side cross-sectional view of a second embodiment of an orienting apparatus according to the present invention.

An alternative embodiment of the orienting means is shown in FIG. 6. Those components in common with the embodiment of FIGS. 1 to 5 are given the same reference numerals. In this embodiment the second conduit includes the conduit 24 of FIGS. 1 to 5 but with an additional semi-circular, vertically oriented, conduit portion 50 between the hose trap 26 and the outlet 8 of the first and second conduits 4 and 6. The hose exiting the hose outlet 8 is oriented as described with reference to FIGS. 1 to 5 but in this case the hose blank 16 is transferred in a vertical semi-circle by the conduit 50 to rotate it through 180°.

Figure 7:
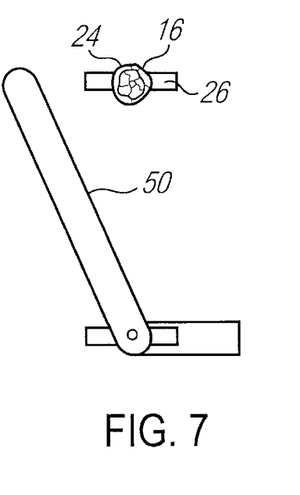
FIG. 7 is a diagrammatic end view of the second embodiment of the present invention in the direction of arrows VII—VII of FIG. 6.

In this embodiment the welt end W of the hose blank 16 is exposed by rotating the semi-circular conduit portion 50 about its bottom end to the position shown in FIG. 7. The hose blank 16 is transferred from the conduit 24 of FIG. 6 to the apparatus 46 of FIG. 11 in the same manner as described earlier with reference to FIGS. 8 to 11.

Figure 22:
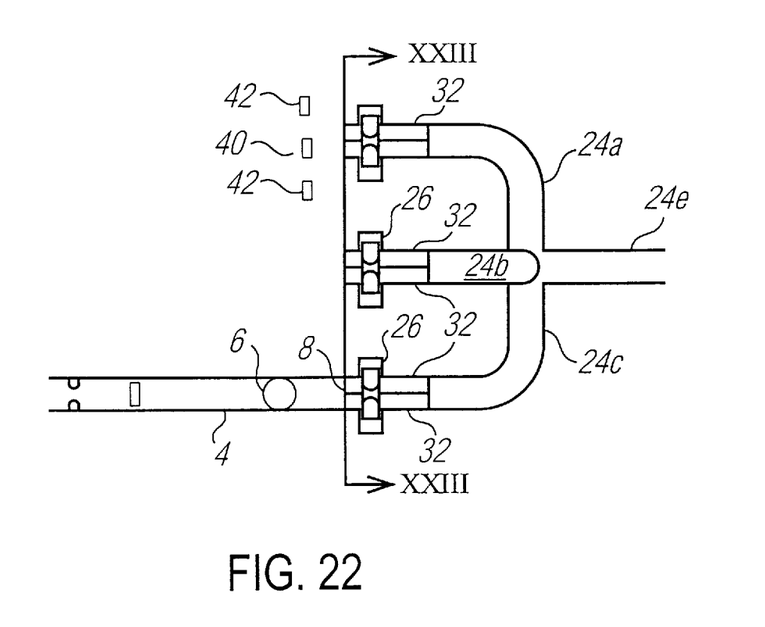
FIG. 22 is a diagrammatic plan cross-sectional view of another embodiment of an orienting apparatus according to the present invention.
Figure 23:
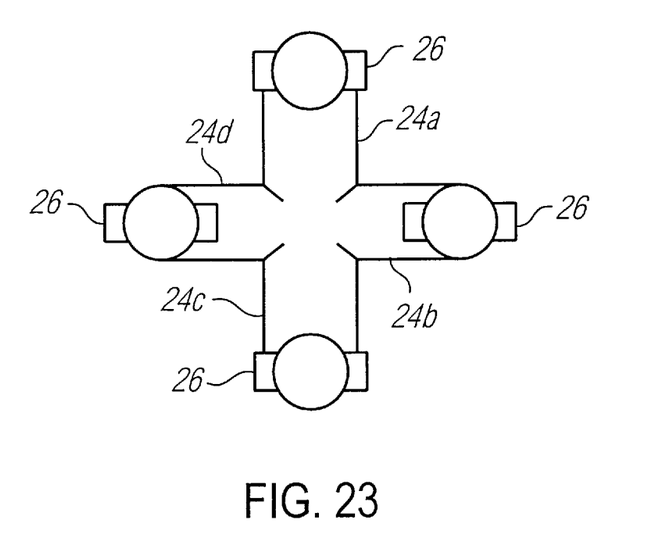
FIG. 23 is a partial diagrammatic plan view of the embodiment of the orienting apparatus of FIG. 22.

In still another embodiment illustrated in FIGS. 22 and 23 the orienting, means again comprises the conduits 4, 6. In place of the further conduit 24 shown in FIGS. 1 to 5 there is a rotary, four-station hose catcher. The four-station catcher has a cruciform array of four open-ended conduits 24a, 24b, 24c and 24d. Each conduit has a welt trap 26 adjacent its open end. The conduits are connected, or connectible, with a source of suction either individually or conjointly via a common suction duct 24c. Suitable suction control valving may be located between the four conduits and the source of suction. Drive means is provided to rotate or index the four station catcher.

In use of this embodiment, the drive means rotates the catcher bringing the open ends of the four conduits in turn to the outlet 8 of the conduits 4, 6. Each conduit will, in turn, receive a single oriented hose blank from the outlet 8. The hose blanks received by the catcher are accommodated in the conduits, with their welt ends exposed at or adjacent the open ends. In turn, the conduits with the hose blanks therein are rotated to a hose-removing location. At this location grippers 40, 42 as described above in connection with FIGS. 8 to 10 take hold of an exposed hose welt, open it and transfer it to the fingers 44 of the loading device 46, which operates as before.

Thereafter the grippers 40, 42 return to collect, open, remove and transfer another hose blank from the next conduit of the catcher to arrive at the said location.

Figure 12:
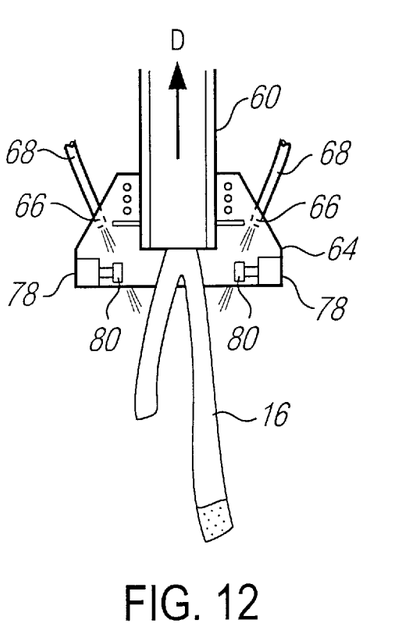
FIG. 12 is a diagrammatic side cross-sectional view of a first retrieval apparatus according to the present invention.

Referring now to FIG. 12 a retrieval apparatus for retrieving a length of flexible material, in the example illustrated a hose blank, comprises a suction tube 60 having an end orifice 62. The tube 60 is coupled to a suction motor (not shown) able to apply suction in the direction of arrow D to hold a hose blank 16 against the end orifice 62. The lower end of the suction tube 60 is laterally enclosed by an open bottomed, generally conical housing 64 in which are located a pair of downwardly and inwardly angled air jet nozzles 66 each coupled to respective air tube 68 by which a blasts of air can be generated at the nozzles 66.

The air jets from the nozzles 66 are directed downwards and towards the end of the suction tube 60 so they can dislodge any hose blank which may be lightly held at the orifice 62 of the suction tube 60. Grippers 78 at the bottom of the housing 64 on opposed sides of the housing can be operated to move co-operating grips 80 horizontally towards each other to grip a hose blank 12 at the orifice 62 thereby supporting hose blank 16 when the suction in suction tube 60 is removed.

Figure 13:
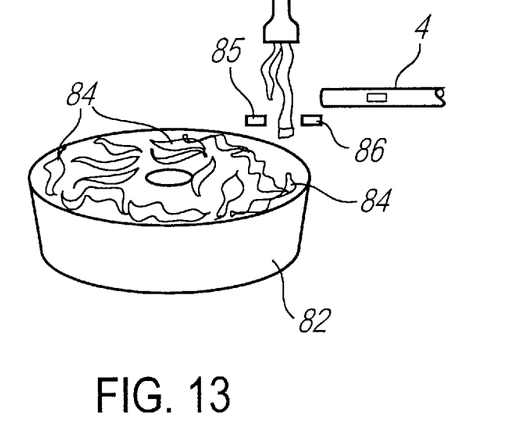
FIG. 13 is a diagrammatic perspective view of the retrieval apparatus of FIG. 12 after retrieval of a hose blank and prior to entry of the hose blank into an orienting apparatus as shown in FIGS. 1 to 5.

Referring now also to FIG. 13 the retrieval apparatus is operated by dropping the end of the suction tube 60 into a tub 82 holding a collection of randomly oriented hose blanks 84. Suction is then applied to the suction tube 60 in the direction D so one or more hose blanks will be sucked towards the orifice 62. The apparatus is then raised vertically and air blasts generated through the nozzles 66 to dislodge all but one hose blank 16 from the end of the suction tube 60. The suction tube 60 is lifted and moved to a predetermined datum position above a photo detector comprising a light source 85 and a photo cell 86. The light source 85 and photo cell 86 are positioned relative to the datum position so that a hose blank 16 will fall between the light source 85 and the photo cell 86 and be detected if it is supported at the orifice 62 sufficiently far from its mid point so that only one end is able to be sucked into the conduit 4 adjacent the photo detectors 86.

If the controller determines by monitoring the photo cell 86 that the retrieval apparatus has picked up the hose blank 16 in a suitable position, then suction is applied to the conduit 4 and the hose blank 16 sucked into the conduit 4 of an orientation apparatus as described with reference to FIGS. 1 to 7. The controller causes the grippers 78 to be released so allowing the hose blank to drop from the retrieval apparatus 12 to be sucked into the conduit 4.

If the hose blank 16 was picked up by the retrieval apparatus near the mid-point, the grippers 78 are opened so the hose blank 16 falls back to the container 82. The retrieval process is then repeated until a single hose blank is picked up in the required position for being drawn into the conduit 4.

Figure 14:
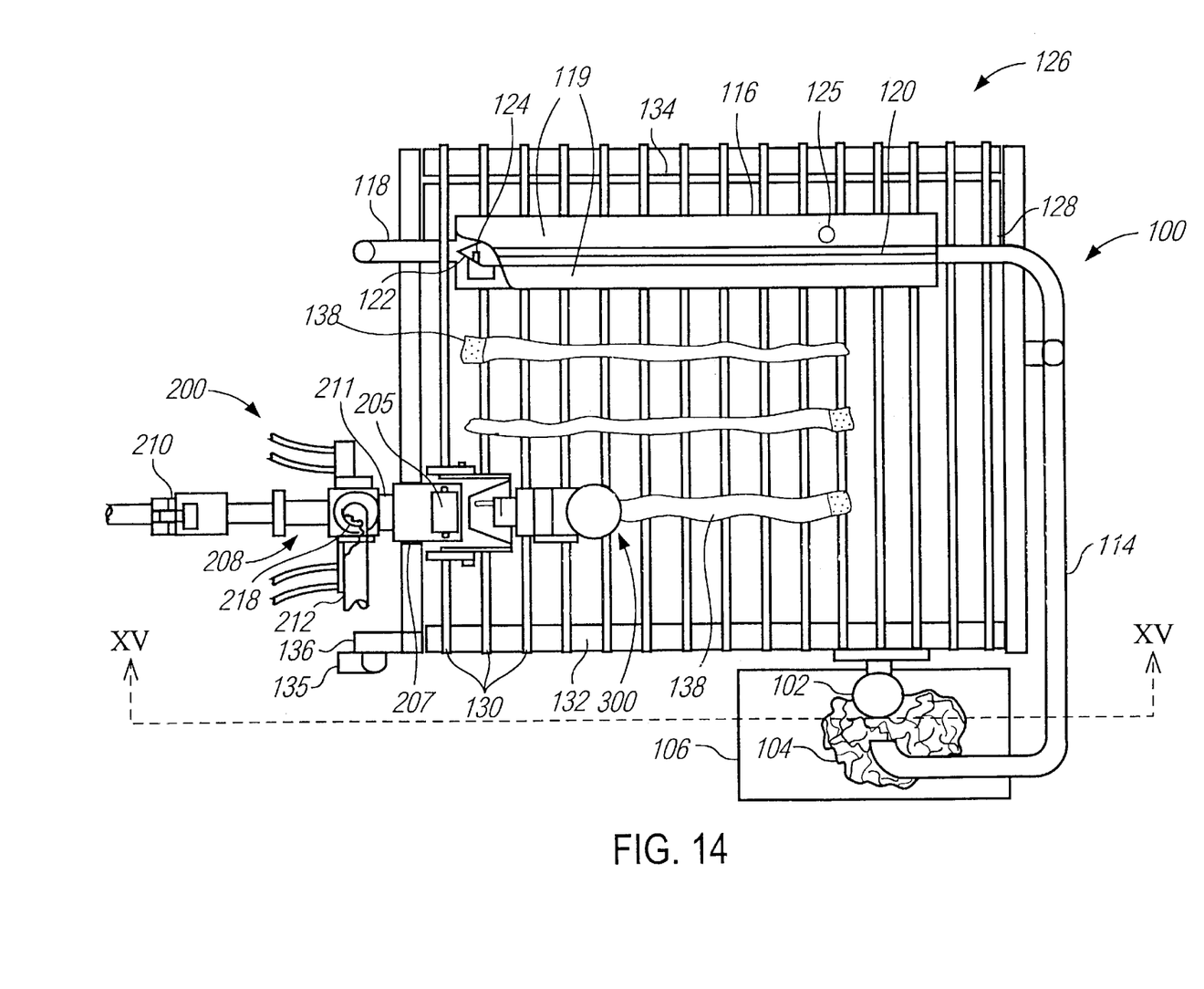
FIG. 14 is a plan view of a preferred embodiment of a retrieving apparatus according to the present invention, in the direction XIV—XIV of FIG. 15.
Figure 15:
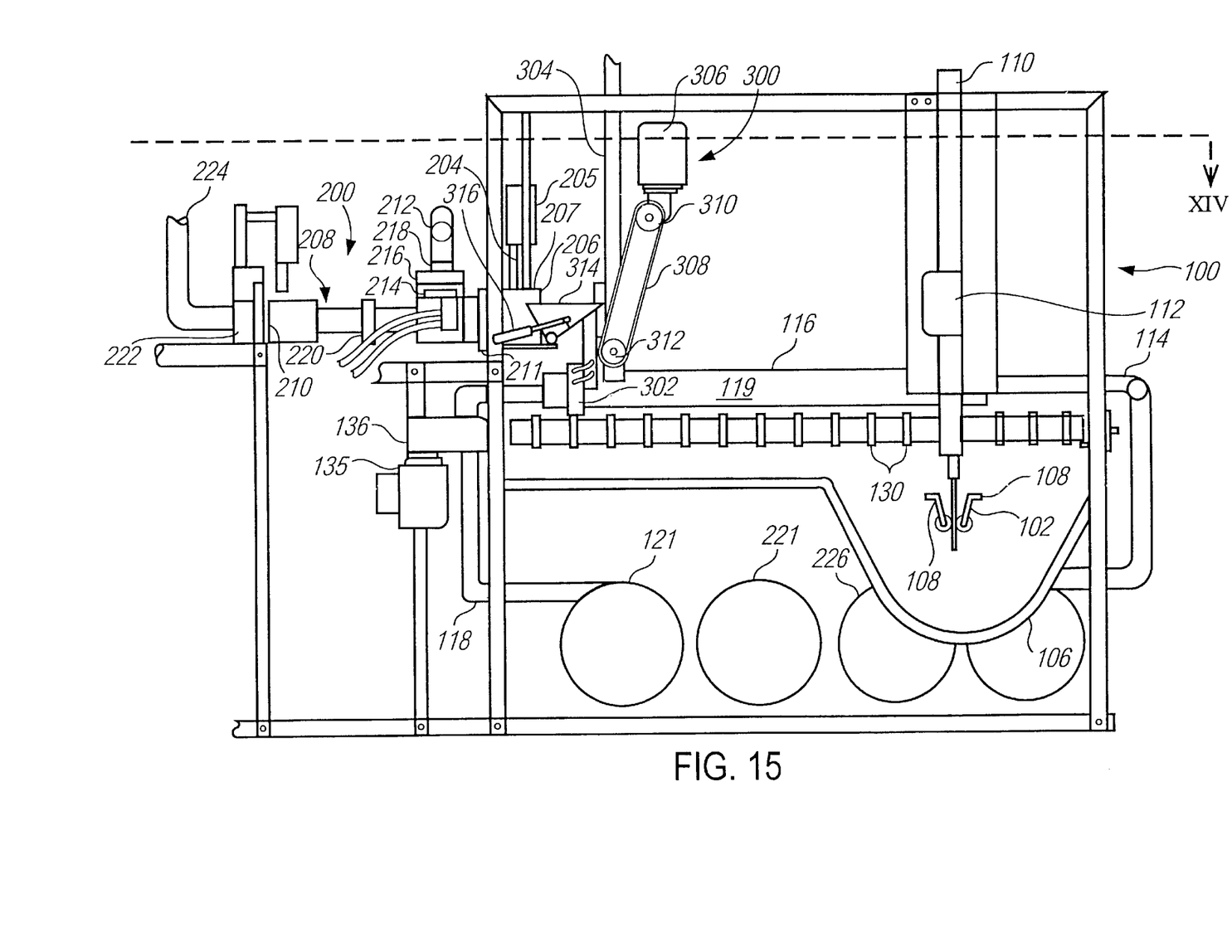
FIG. 15 is a diagrammatic end view of the embodiment of FIG. 14 in the direction XV—XV of FIG. 14.

Referring now to FIGS. 14 and 15, there is shown a system of combined retrieving and orienting apparatus including a retrieving apparatus indicated generally by the reference numeral 100 and an orienting apparatus indicated generally by the reference numeral 200. The retrieving apparatus includes a gripping means 102 for gripping and removing one or more lengths of flexible material, in this case tubular hose 104, (not shown in FIG. 15) from a storage bin 106.

The gripping means includes a pair of opposable gripping arms 108 which are pivotable to permit the arms 108 to move together thereby gripping a tubular hose between the arms. The gripping arms can be raised and lowered vertically along a guide rail 110 to lower the gripping arms into the storage bin 106 to be in a position to grip a tubular hose 104 and to lift the tubular hose out of the storage bin 106 by moving vertically upwards. The motive power for these operations is obtained from a motor 112 which is shown, for clarity reasons, in simplified form with no indication of the controls or particular constitution of this arrangement. It falls readily within the skills of a person familiar with this field to construct this and the other features of this embodiment to put the invention into practice.

A conduit 114 has one open end positioned above the storage bin 106 at a location where tubular hose raised out of the bin by the gripping means 102 can be presented to the opening of the conduit 114. The conduit 114 extends horizontally rearward of the apparatus to an elongate dispenser 116 and extends from the other end of the dispenser 116 via portion 118 of the conduit to a suction motor 121 located beneath the dispenser 116.

The dispenser 116 has two longitudinally extending wings 119 hinged along a central hinge line 120. When the wings 119 of the dispenser 116 are closed the interior of the dispenser completes an airflow path from the conduit 114 through to the conduit 118. The flow path in the dispenser 116 towards the conduit 118 and suction motor 121 narrows to form a constricted throat 122 at the end of the dispenser.

Positioned close to the apex of the throat 122 is a latch 124 which can be moved from a retracted position to a position extending across the throat 122 across the dispenser 116 as shown in FIG. 14. Located in one of the wings 119 is a photodetector 125 which is arranged to detect whether or not any material lies within the dispenser at this position. The dispenser 116 is supported above a bed 126 which is in the form of a metal panel 128 across which run endless belts 130 fitted around shafts 132 and 134 at opposite ends of the plate 128. The shaft 132 is a driven shaft rotatable by motor 135 via a transmission 136. The shaft 134 is a driven shaft which rotates when the belts 130 are rotated by the driven shaft 132.

The belts are spaced sufficiently close such that they can move a length of tubular hose 138 across the plate 128 which the hose contacts where it sags between the conveyor belts 130 and rubs against the plate 128.

The retrieval apparatus 100 of FIGS. 14 and 15 operates as follows.

The gripper 102 is lowered into the bin 106 until it reaches the collection of hose 104. The distance the gripper is lowered into the storage bin can be controlled by any convenient sensor which determines when the gripper is at or close to the top of the pile of tubular hose. For example a contact switch can be located at the end of the gripper 102 which closes on contact with the topmost tubular hose 104 thereby indicating to an automated control system (not shown) that the gripper 102 has reached the desired position within the storage bin 106.

The control then causes the gripper arms 108 to rotate and meet together thereby gripping one or more of the tubular hose 104 whereupon the gripper arm is raised to a position where the lower end of the tubular hose gripped by the gripper is adjacent the opening of the conduit 114.

This raised position of the gripper arm 102 can be determined by means of a photodetector arrangement, for example, positioned below the opening of the conduit 104 which will give an indication to the control means when the lowermost end of the hose gripped by the gripper has just passed the photodetector thereby indicating that the lowermost extremity of the tubular hose is in the required position adjacent the opening of the conduit 114.

The suction motor 121 is then coupled to the conduit 118, dispenser 116, and conduit 114 to suck the gripped hose into the conduit 114 whereupon the gripper arms 108 are retracted away from each other thereby releasing the hose 104 so that they are sucked along the conduit 114 into the dispenser 116.

The hose 104 entering the conduit 114 will bunch up at the distal end of the conduit of the dispenser 116 at the throat 122. Generally speaking only one hose will be in the throat 122 in a position to be latched by the latch 124 when it is now closed across the throat 122 although it is possible that in some circumstances two hose may be in such a position. After the latch 124 has been extended across the throat 122 the motor 121 is connected to the conduit 118 such that the flow of air through the conduit 118 is reversed. If more than two hose had entered the conduit 114 initially, of which one is now gripped in the dispenser, those additional hose will now be blown back along the conduit 114 to return to the storage bin 116 whilst the hose latched in the dispenser 116 will be extended along the dispenser 116 from the latch 124 towards the end of the dispenser 116 nearer the conduit 114.

If only one hose was initially introduced into the conduit 114 then the above blowing operation still takes place but in this case the only action is to extend the hose 104 latched by the latch 124 in the manner just described.

In either case there will be, except in exceptional circumstances, only one hose latched by the latch 124. In this particular application shown in FIG. 14 it is preferable that it is the end of the hose in the dispenser 116 that has been latched by the latch 125. That this has been achieved can be determined in this embodiment by use of the photodetector 125 which can be used to indicate whether there is any material in the dispenser at the position of the photodetector 125. Because the photodetector 125 is located in a position slightly short of the length of the hose 104, if the photodetector indicates the presence of material then the controller will have determined that the trapped hose is indeed latched near one of its ends. If, however, the photodetector 124 indicates that there is no material in that position then the inference the controller can make is that the latch 124 has latched the hose more towards the middle causing the effective shortening of the hose within the dispenser 116 or not trapped a hose at all. In this case the controlling means releases the latch means 124 while still blowing air in the direction of the storage means 116 thereby removing any hose 104 from the dispenser 116 and returning it to the storage bin for a repeat attempt at reloading a length of hose to attempt to once more to latch hose at one end by the latch means 124 as required.

If the gripper 102 failed to grip any hose 104 in the bin 106 then there will be no hose in the dispenser 116 to be dispensed by the latch means 124. Again the photodetector 125 will indicate to the controller that there is no material at that position and so will continue to blow air in the direction towards the storage bin 106 for the time required to transport hose back to the storage bin, even though there is none present in this case, whereupon reloading will again take place. Once the dispenser has latched a hose which extends to a photodetector 125 whilst air is blowing through the conduit 118 toward the storage bin 106 then the blowing is stopped and the latch 125 can be released to leave a hose lying within the dispenser in an extended position. The dispenser can then be opened by pivoting the wings 119 apart about the hinge line 120 thereby allowing the hose to drop onto the conveyor belts 130 to be moved laterally away from beneath the dispenser.

This action is then repeated the result being a succession of hose 138 laid out along the conveyor belts 130 separated from each other by an amount the conveyor belt is incremented after the controller determines that the hose has been successfully trapped in the dispenser 116 and subsequently dropped onto the conveyor belts 130.

The net result of the above operations of the retrieval apparatus 100 is that during each cycle of the operation of the retrieving apparatus 100 a single hose is retrieved from the storage bin 116 whether or not the gripping means itself retrieves more than one hose 104 from the storage bin 106.

In the apparatus of FIG. 14 the conveyor belts 130 transfer each of the successively transferred single hose 104 towards an orienting apparatus 200 which will now be described also with reference to FIGS. 14 and 15. However, it should be noted that the retrieval apparatus 100 as just described whether with the conveyor belts 130 or not, can be used with other apparatus than that about to be described where a single length of flexible material needs to be retrieved from a collection of such articles.

The orienting means 200 includes a gate 207 including a gate blade 204 which can be moved into and out of the gate 207 by a drive 205 to open or close the gates 207. At the entrance of the gate is a photodetector 206 (see FIGS. 16 to 21). The entrance of the gate defines the opening of a first conduit 208 (see FIGS. 16 to 20) which extends to an outlet 210. Beyond the gate 207 on the opposite side from the photodetector 206 is a further photodetector 211. A second conduit 212 intersects the first conduit 208 beyond the second photodetector 211 and, in the path direction moving away from the conduit 208 includes a gate 214, a photodetector 216 and a grill 218. The conduit 212 extends beyond the grill 218 to a suction motor 221 below the conveyor belts 130 as shown in FIG. 15. For clarity the conduit connection to the motor 221 is not shown.

Continuing along the length of the path of the first conduit 208 beyond the junction with the second conduit 212 there is a further photodetector 220 positioned in front of the outlet 210 of the first conduit 208. Beyond the outlet 210 of the first conduit 208 is a further gate 222 at the entrance to a further conduit 224 which extends to a suction motor 226 located underneath the conveyor belts 130 as shown in FIG. 15. Again the connection of the conduit 224 to the suction motor 226 is not shown for reasons of clarity.

Although the orienting means 200 can be used to orient a length of flexible material as will be described below, a length of material presented to the input of the inlet of the conduit 208 by whichever method is convenient in the circumstances when using the orienting means of the present invention, there will now be described a preferred arrangement in which hose retrieved by the retrieving apparatus 100 as previously described is presented to the entrance of the conduit 208 by the following apparatus as will now be described with reference to FIGS. 14 and 15.

A gripper mechanism designated generally by the reference numeral 300 includes a gripper 302 which can be raised or lowered vertically along a guide rail 304 by means of a conveyor track (not shown) which conveyor track is driven by a motor 306 coupled to the conveyor track by means of belt 308 between a driving shaft 310 of the motor 306 and a driven shaft 312 about which the conveyor track is mounted. The gripping means 302 is positioned such that when it is moved to the lowered position, as shown in FIG. 15, it is adjacent the end of a length of hose 138 as conveyed to the gripping means 302 by the conveyor belt 130 from the dispenser 116.

The advantage of this arrangement is that the gripping position is known to be at the end of the hose so that the distal end of the hose can be reliably presented to the of the orienting apparatus 200 as will now be described.

In the position of the gripper 302 as shown in FIG. 15 gripper arms (not shown) close together and grip the hose adjacent one end. The motor 306 then drives the gripper arms and hose upwards past a hinged trough 314 which is pivoted to allow the gripper arm to pass by by a piston cylinder arrangement 316 from the position shown in FIG. 15 to one in which the right hand lower inclined surface is substantially vertical. The gripper is driven vertically sufficiently for the lower, hanging, end of the hose to be above the trough 314. When the gripper arms are in this position the piston cylinder arrangement 316 is operated to lower the trough 314 into position shown in FIG. 15.

The gripper 302 is then driven downwards by the motor 306 to lower the hanging end of the hose into the trough 314 whose sloping bottom surface guides the end of the hose to the inlet of the conduit 208.

The operation of the orienting means will now be described with reference also to FIGS. 16 to 21.

There are two situations which will now be considered in turn. Firstly, when the end presented to the inlet of the conduit 208 is the toe end of the hose and secondly when it is the bulkier welt end of the hose that is presented to the inlet of the conduit 208. At this point gate 207 is in the partially open position in which the toe but not the welt of the hose can pass through, whereas gate 214 is open and gate 222 is open so as to apply maximum suction to the conduit 208 from the conduit 224.

Figure 16:
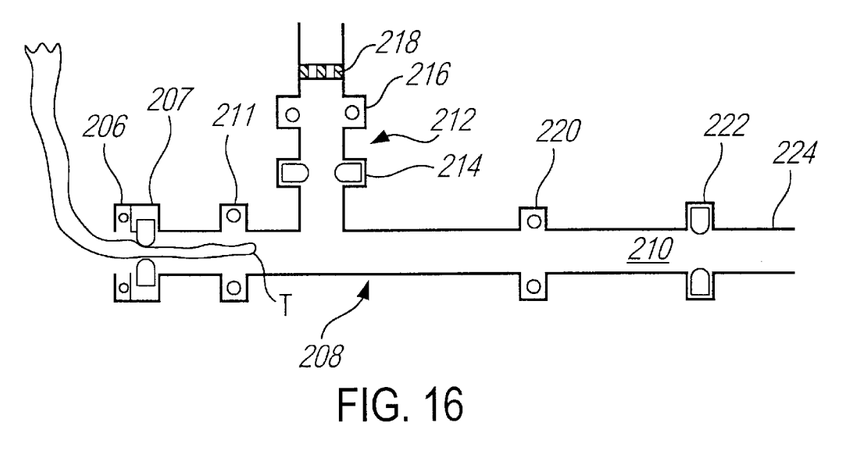
FIGS. 16 to 21 are diagrammatic side cross-sectional views of a second embodiment of an orienting apparatus according to the present invention.
Figure 17:
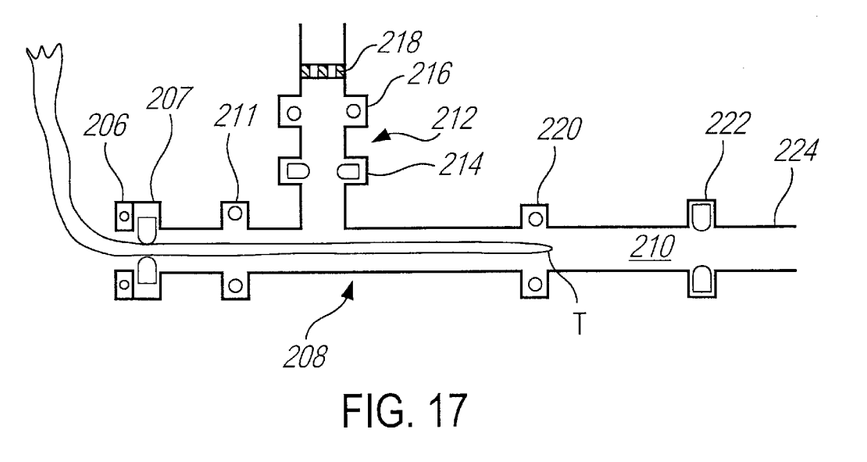

If it is a toe end T that is being presented to the input of the conduit 208 then as the gripping means 302 is lowered so the toe end T of the hose will be able to pass through the gate 207 and within a known time be detected by the photodetector 211 which indicates to the controller that it is indeed the toe end T that has entered the conduit 208 as shown in FIG. 16. In this case the orienting apparatus stays in the same configuration as the gripping means 302 is lowered allowing the toe end T of the hose to extend down the conduit 208 until it reaches the photodetector 220 whereupon the gate 222 at the outlet 210 of the conduit 208 is narrowed to a gap which allows only the toe end of the hose to pass through and the gripping means is released as shown in FIG. 17.

Figure 18:
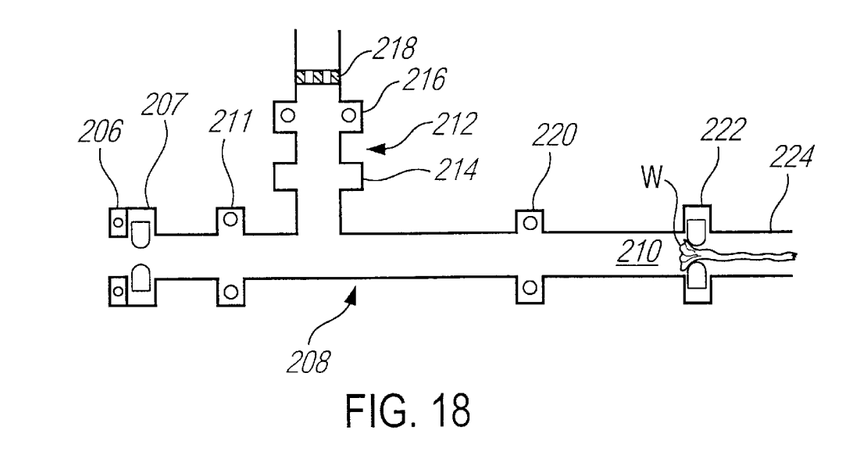
Figure 19:
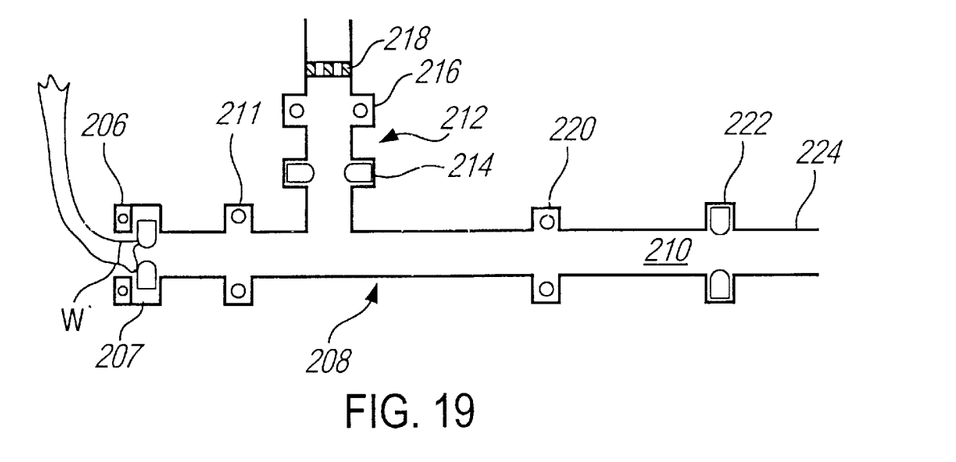
Figure 20:
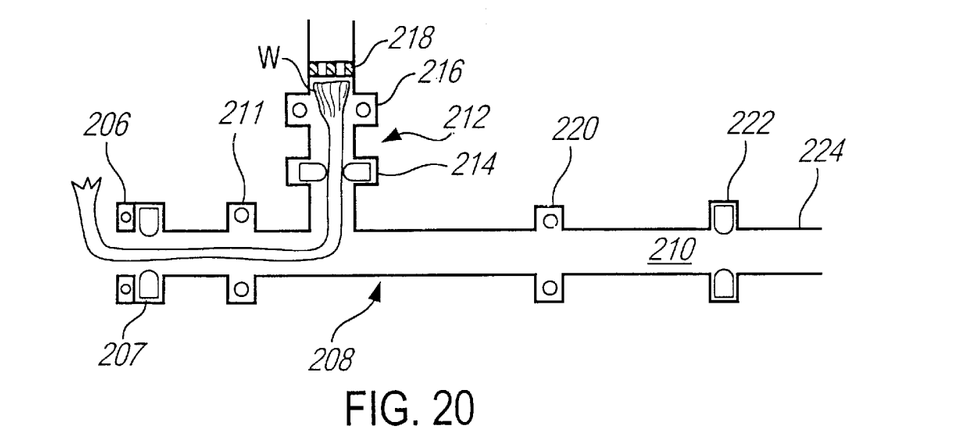

On release of the hose from the gripping means the hose is sucked toe end T first through gate 222 into the conduit 224 until its progress is halted when the welt end W reaches the gate 222 as shown in FIG. 18. The hose is then in the required position with respect to the gate 222 whereupon the conduit 224 can be moved away from the first conduit 208 to position the welt where required for the next processing step to be carried out upon it.

In the case that the welt end of the hose is presented to the input of the conduit 208 the photodetector 206 will detect its presence but it will not reach the photodetector 211 in the predetermined amount of time because it will be unable to pass through the gate 207 which as noted above is set to a gap which only allows the narrow toe-end T of the hose to pass through. When the fact that it is the welt end that has been presented to the conduit 208 is detected in this manner then the suction applied to conduit 224 is switched off and instead suction is applied to the second conduit 212 and the first gate 207 is opened to allow the welt end W through the gate 207 to be sucked into the second conduit 212 past the photodetector 216 to be arrested in its progress by the grill 218 as the gripper 302 lowers allowing the hose to pass into the conduit 212. When the welt end W of the hose reaches the photodetector 216 in the second conduit 212 the controller causes the gate 214 to close so trapping the welt end W of the hose which is now adjacent to the grill 218 and for the gripper 302 to release so arriving at the situation illustrated in FIG. 20.

Figure 21:
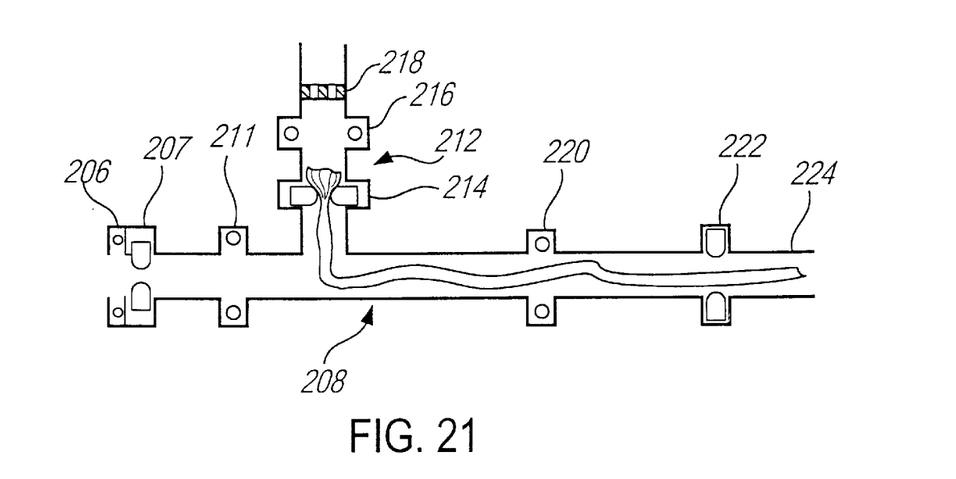

The suction to second conduit 212 is removed and suction again applied to the conduit 224 which has the effect of sucking the hose along the conduit 208 until the hose extends through the gate 222 with the welt still trapped behind the gate 214 as shown in FIG. 21. Shortly thereafter the gate 222 can be closed to the partially open position which allows all but the welt end W of the hose to pass through.

The gate 214 is then opened to release the welt end W of the hose whereupon the hose passes along the conduit 208 and into the conduit 224 until trapped by the gate 222 as shown in FIG. 18.

It can thus be seen that whether the welt end or the toe end is presented to the inlet of the conduit 208 the hose will in each case end up in the position shown in FIG. 18 where the welt end is trapped by the gate 222 whereupon the conduit 224 can be moved to a different station for further processing of the hose for example by applying gripper means to the welt end to remove the hose from the conduit 224 for further processing as previously described.

For the avoidance of doubt it should be noted that the orienting apparatus of FIGS. 1 to 7, the orienting apparatus as illustrated in FIGS. 15 to 21, the retrieving apparatus as shown in FIGS. 12 and 13, and the retrieving apparatus as shown in FIGS. 14 and 15 can all be used independently of each other with other orienting means, retrieving means or other flexible material processing apparatus as required and that these apparatus method are not restricted to the use in the combinations described beforehand.

It will be appreciated that those of ordinary skill in this art given the description of the operation of the various components as described above will understand how to construct a suitable pneumatic control system, the provision of a controlling means to operate the various motors, gates and other aspects of the embodiments of the invention described are achieved using well known and generally available microprocessor based control systems, the particular details of which are incidental to the invention and can be implemented as convenient to provide apparatus or methods according to the invention which is as claimed in the appended claims.

The foregoing description is concerned with the handling of flaccid articles e.g. in the manufacture of garments, e.g. hosiery garments.

Automatic dispensing of limp articles having dissimilar ends, and their conveyance in an orderly manner to a receiver so that they always arrive there with given ends leading, are beset with problems. Such problems are avoided when dispensing is done manually. The human operator takes an article e.g. from a bin, inspects it and then simply lays it on a conveyor or the like in the required orientation.

Such articles, of course, include hose blanks to be made up into pantihose. The blanks are flaccid tubular knits having toe and welt ends, which are dissimilar. At a supply point, the blanks will ordinarily be in a random jumble. From here, they need to be taken sequentially and conveyed e.g. to a machine instrumentality which loads them onto a support, for further processing. There is a need for the blanks to be conveyed in an orderly manner, e.g. with their welt ends always leading so that the receiving machine instrumentality can correctly perform its designated task.

One prior approach involves a conveyor which receives hose and conveys them welt or toe leading as the case may be to a location at which the conveyor divides into two lines. Hose are directed into the different lines depending on whether they arrive at the said location toe first or welt first. Toe-leading hose, for instance, are directed in a reverse direction to welt-leading hose and into a loop line, while welt-leading hose continue onwards without any reversal of motion. Thanks to the reversal of motion of the toe-leading hose, they enter the loop line welt first, and are then conveyed along that line to a machine instrumentality so as to arrive there welt first. Hose which originally arrived at the said location welt first are conveyed directly to the machine instrumentality without any reversal of motion.

This prior approach involves pneumatic or suction conveyors, lengthy duct-work, numerous valves and a microprocessor to control the system, and overall is relatively complex and inevitably costly to realise.

The apparatus and process of the present invention accomplishes the same end more simply and cost effectively.

According to the invention in its apparatus and process realisations, limp articles having dissimilar first and second ends are advanced lengthwise along a single path, first or second ends leading as the case may be. In the path, means are provided to discriminate between the first and second ends and further means responsive to the discriminating means are provided momentarily to arrest any article moving along the path, e.g. second end leading, while permitting articles moving opposite end leading to continue unhindered along the path. The arresting means may engage an article advancing second end leading at or adjacent that end and, while that end is arrested the remainder of the article continues its motion along the path; in the process the article is effectively turned end-for-end until its opposite end is leading whereupon the arresting means releases the article for continuing movement along the path.

It will be appreciated that this aspect of the invention can be realised simply and reliably in a pneumatic or suction conveying system. While preferred embodiments of the invention have been described above, it is to be understood that any and all equivalent realizations of the present invention are included within the scope and spirit thereof. Thus, the embodiments depicted are presented by way of example only and are not included as limitations upon the present invention. Thus, while particular embodiments of the invention have been described and shown, it will be understood by those skilled in this art that the present invention is not limited thereto since many modifications can be made. Therefore, it is contemplated that any and all such embodiments are included in the present invention as may fall within the literal or equivalent scope of the appended claims.

I claim:

1. Apparatus for handling elongate flexible hosiery articles having first and second ends to orient said articles with a selected one of said ends of said articles leading, said apparatus comprising:

a first fluid conduit having an inlet for receipt of a said article;

a second fluid conduit in fluid communication with said first conduit, said first fluid conduit being connectable to a source of suction and said second conduit being connectable to a source of suction;

a detect or located along said first conduit upstream of said second conduit for detecting which of said article ends is leading; and a control system configured, upon a selected end of said article being detected as leading said article into said first conduit, to apply suction in said first conduit to cause the article to move past said second conduit, without entering said second conduit, for further handling and configured, upon a non-selected end of said article being detected as leading said article into said first conduit, to apply suction in said second conduit to cause said non-selected end to move into said second conduit and thereafter apply suction to said first conduit to cause said selected end of said article to move beyond said second conduit and become the lead end of said article for further handling.

2. The apparatus as in claim 1, wherein said flexible article is a hosiery blank having a toe end and a welt end, wherein said toe end is said selected end and wherein said first conduit includes a trap mechanism disposed proximate said inlet of said first conduit so that suction applied within said first conduit draws a said hosiery blank presented to said inlet to said trap, said trap being selectively positionable between an open position that permits said hosiery blank to pass through said trap and a closed position that permits all of said hosiery blank except said welt end to pass through said trap.

3. The apparatus as in claim 2, wherein said detector includes a first detection device downstream from said trap a distance at most as far as the length of a said hosiery blank, said first detection device being configured to detect the presence or absence of a said hosiery blank in said first conduit when said trap is closed.

4. The apparatus as in claim 3, wherein said detector includes a second detection device upstream from said trap, said second detection device being configured to detect the presence or absence of a said hosiery blank in said first conduit proximate said trap.

5. The apparatus as in claim 4, wherein said control system is configured to cause suction to be applied to said second conduit to draw a said hosiery blank into said second conduit upon opening said trap when said hosiery blank presented to said inlet is blocked from passing through said trap in its closed position by said welt end and wherein said control system is configured to cause suction to be applied to said first conduit to draw a said hosiery blank directly through said first conduit upon opening said trap when said hosiery blank presented to said inlet passes through said trap in its closed position except for said welt end.

6. Apparatus for handling elongate flexible hosiery articles having first and second ends to orient said articles with a selected one of said ends of said articles leading, said apparatus comprising:
   a first fluid conduit having an inlet for receipt of a said article;
   a second fluid conduit in fluid communication with said first conduit, said first conduit being connectable to a source of suction and said second conduit being connectable to a source of suction, wherein said second conduit includes a stop mechanism configured to permit air passage thereby but to block passage of said a said hosiery article;
   a detector located along said first conduit upstream of said second conduit for detecting which of said article ends is leading; and
   a control system configured, upon a non-selected end of said article being detected as leading said article into said first conduit, to apply suction in said second conduit to cause said non-selected end to move into said second conduit and thereafter apply suction to said first conduit to cause said selected end of said article to move beyond said second conduit and become the lead end of said article for further handling.

7. The apparatus as in claim 5, wherein said stop mechanism includes a grate extending across said second conduit.

8. The apparatus as in claim 5, wherein said stop mechanism includes a restraining device configured to secure a said hosiery article proximate said non-selected end and wherein said control system is configured, when said restraining device has secured said article, to cease suction in said second conduit, to apply suction in said first conduit, and to release said article from said restraining device when said selected end moves beyond said non-selected end.

9. The apparatus as in claim 28, including a third fluid conduit including an inlet in communication with said first conduit downstream from said second conduit and configured to receive a said hosiery article from said first conduit.

10. Apparatus for handling elongate flexible hosiery articles having first and second ends to orient said articles with a selected one of said ends of said articles leading, said apparatus comprising:
   a first fluid conduit having an inlet for receipt of a said article;
   a second fluid conduit in fluid communication with said first conduit, said first fluid conduit being connectable to a source of suction and said second conduit being connectable to a source of suction;
   a third fluid conduit including an inlet in communication with said first conduit downstream from said second conduit and configured to receive a said hosiery article from said first conduit;
   a detector located alone said first conduit upstream of said second conduit for detecting which of said article ends is leading; and
   a control system actuatable upon a non-elected end of said article being detected as leading said article into said first conduit to apply suction in said second conduit to cause said non-selected end to move into said second conduit and thereafter apply suction to said first conduit to cause said selected end of said article to move beyond said second conduit and become the lead end of said article for further handling,
   wherein said flexible material is a hosiery blank having a toe end and a welt end and wherein said third fluid conduit includes a trap mechanism disposed proximate said inlet of said third conduit so that suction applied within said third conduit draws a said hosiery blank received from said first conduit trap to said trap of said third fluid conduit, said third conduit trap being selectively positionable between an open position that permits said hosiery blank to pass through said third conduit trap and a closed position that permits all of said hosiery blank except said welt end to pass through said third conduit trap.

11. The apparatus as in claim 10, wherein said third fluid conduit is moveable from communication with said first conduit to expose said welt end of a said hosiery blank received by said third conduit from said first conduit and stopped within said third conduit by said third conduit trap in its closed position.

12. The apparatus as in claim 11, wherein said third fluid conduit includes an openable section, said openable section including said inlet to said third fluid conduit and being selectively openable so that a portion of said hosiery blank received by said third conduit and including said welt end is unsupported by said third conduit.

13. The apparatus as in claim 12, wherein said openable section comprises an upstream portion of said third fluid conduit split into opposing longitudinal half sections, each said half section being pivotally connected to the remainder of said third fluid conduit so that said half sections pivot outward from said third fluid conduit opposite from one another when said openable section is opened.

14. The apparatus as in claim 9, including a cruciform array of four said third fluid conduits rotationally disposed so that each of said third fluid conduits of said cruciform array may be selectively brought into communication with said first conduit to receive a said hosiery article.

15. The apparatus as in claim 11, including a gripping mechanism configured to grip and open said exposed welt end.

16. The apparatus as in claim 15, wherein said gripping mechanism is configured to remove said hosiery blank from said third conduit for further handling.

17. The apparatus as in claim 1, wherein said second conduit is at least as long as a said hosiery article received thereby.

18. A method for handling elongate flexible hosiery articles having first and second ends to orient said articles with a selected one of said ends of said articles leading, said method comprising the steps of:
   drawing a said article into a first fluid conduit;
   determining whether said selected end or a non-selected end leads said article;
   if said selected end leads said article, drawing said article past said second conduit, without entering said second conduit, for further handling;

if said non-selected end leads said article, drawing at least said non-selected end portion of said article into a second fluid conduit in fluid communication with said first conduit; and when said non-selected end is drawn into said second conduit, drawing said selected end beyond said second conduit to cause said selected end to become the lead end of said article for further handling.

19. The method as in claim 18, wherein said drawing of said non-selected end into said second conduit step includes arresting said article at or near said non-selected end and wherein said drawing of said selected end beyond said second conduit step includes releasing said article from said second conduit when said selected end has moved beyond said second conduit.

20. An apparatus for retrieving elongate flexible hosiery articles from a collection of said articles, said apparatus comprising:

a suction tube having an inlet and being connected to a suction source, said inlet being configured so that a said article is drawn to said inlet from said collection when suction is applied to said suction tube; and at least one air stream source configured to direct an air stream to an area proximate said inlet to dislodge said articles that are loosely held about said inlet other than a said article secured at said inlet.

21. The apparatus as in claim 20, including a gripping mechanism proximate said inlet and configured to grip said article secured at said inlet.

22. The apparatus as in claim 20, including a detector device disposed upstream from said inlet a predetermined distance, said predetermined distance being at most equal to the length of a said article, to detect the presence or absence of a said article.

23. Apparatus for retrieving elongate flexible hosiery articles having first and second ends from a collection of said articles and for orienting said articles with a selected one of said ends of said articles leading, said apparatus comprising:

a suction tube connected to a suction source and movable to a position proximate said collection, said suction tube having an inlet configured so that a said article is drawn to said suction tube inlet from said collection when suction is applied to said suction tube, said suction tube being movable from said collection to present a said article drawn to said suction tube inlet for further handling;

at least one air stream source configured to direct an air stream to an area proximate said suction tube inlet to dislodge said articles that are loosely held about said suction tube inlet other than to a said article secured at said suction tube inlet;

a first fluid conduit having an inlet for receipt of a said article presented by said suction tube;

a second fluid conduit in fluid communication with said first conduit, said first fluid conduit being connectable to a source of suction and said second conduit being connectable to a source of suction;

a detector located along said first conduit upstream of said second conduit for detecting which of said article ends is leading; and a control system configured, upon a non-selected end of said article being detected as leading said article into said first conduit, to apply suction in said second conduit to cause said non-selected end to move into said second conduit and thereafter apply suction to said first conduit to cause said selected end of said article to move beyond said second conduit and become the lead end of said article for further handling.

24. The apparatus as in claim 23, including a third fluid conduit including an inlet in communication with said first conduit downstream from said second conduit and configured to receive a said hosiery article from said first conduit, wherein said flexible article is a hosiery blank having a toe end and a welt end, wherein said toe end is said selected end and wherein said first conduit includes a trap mechanism disposed proximate said inlet of said first conduit so that suction applied within said first conduit draws a said hosiery blank presented to said inlet to said trap, said trap being selectively positionable between an open position that permits said hosiery blank to pass through said trap and a closed position that permits all of said hosiery blank except said welt end to pass through said trap, wherein said detector includes a first detection device downstream from said trap a distance at most as far as the length of a said hosiery blank, said first detection device being configured to detect the presence or absence of a said hosiery blank in said first conduit when said trap is closed, wherein said detector includes a second detection device upstream from said trap, said second detection device being configured to detect the presence or absence of a said hosiery blank in said first conduit proximate said trap, wherein said control system is configured to cause suction to be applied to said second conduit to draw a said hosiery blank into said second conduit upon opening said trap when said hosiery blank presented to said inlet of said first conduit is blocked from passing through said trap in its closed position by said welt end and wherein said control system is configured to cause suction to be applied to said first conduit to draw a said hosiery blank directly through said first conduit upon opening said trap when said hosiery blank presented to said inlet of said first conduit passes through said trap in its closed position except for said welt end, wherein said second conduit includes a stop mechanism configured to permit air passage thereby but to block passage of said a said hosiery article, said stop mechanism including a grate extending across said second conduit and a restraining device configured to secure a said hosiery article proximate said non-selected end and wherein said control system is configured, when said restraining device has secured said article, to cease suction in said second conduit, to apply suction in said first conduit, and to release said article from said restraining device when said selected end moves beyond said non-selected end, wherein said third fluid conduit includes a trap mechanism disposed proximate said inlet of said third conduit so that suction applied within said third conduit draws a said hosiery blank received from said first conduit trap to said trap of said third fluid conduit, said third conduit trap being selectively positionable between an open position that permits said hosiery blank to pass through said third conduit trap and a closed position that permits all of said hosiery blank except said welt end to pass through said third conduit trap, wherein said third fluid conduit is moveable from communication with said first conduit to expose said welt end of a said hosiery blank received by said third conduit from said first conduit and stopped within said third conduit by said third conduit trap in its closed position, an upstream portion of said third fluid conduit, including said third fluid conduit inlet, being split into opposing longitudinal half sections, each said half section being pivotally connected to the remainder of said third fluid conduit so that said half sections are selectively pivotable outward from said third fluid conduit opposite from one another so that a portion of said hosiery blank received by said third conduit and including said welt end is unsupported by said third conduit, and wherein said apparatus includes a gripping mechanism configured to grip and open said exposed welt end and to remove said hosiery blank from said third conduit for further handling.

\* \* \* \* \*